(12) United States Patent
Kim et al.

(10) Patent No.: US 10,003,464 B1
(45) Date of Patent: Jun. 19, 2018

(54) BIOMETRIC IDENTIFICATION SYSTEM AND ASSOCIATED METHODS

(71) Applicant: Cerebral, Incorporated, Cocoa, FL (US)

(72) Inventors: Taeyup Kim, Alpharetta, GA (US); David Bartine, Cocoa, FL (US)

( * ) Notice: Subject to any disclaimer, the term of this patent is extended or adjusted under 35 U.S.C. 154(b) by 0 days. days.

(21) Appl. No.: 15/616,282

(22) Filed: Jun. 7, 2017

(51) Int. Cl.
*H04L 9/32* (2006.01)
*H04L 29/06* (2006.01)

(52) U.S. Cl.
CPC ........ *H04L 9/3231* (2013.01); *H04L 63/0861* (2013.01); *H04L 63/0876* (2013.01); *H04L 63/0884* (2013.01); *H04L 63/083* (2013.01)

(58) Field of Classification Search
CPC ............... H04L 9/3231; H04L 63/0861; H04L 63/0876; H04L 63/0884; H04L 63/083
See application file for complete search history.

(56) References Cited

U.S. PATENT DOCUMENTS

| | | | |
|---|---|---|---|
| 3,764,081 A | 10/1973 | Seydelmann | |
| 3,879,000 A | 4/1975 | Muller et al. | |
| 4,000,861 A | 1/1977 | Grebe et al. | |
| 4,410,280 A | 10/1983 | Yamauchi et al. | |
| 4,850,704 A | 7/1989 | Zimmerly et al. | |
| 4,889,248 A | 12/1989 | Bennett | |
| 5,168,797 A | 12/1992 | Wang | |
| 5,195,427 A | 3/1993 | Germano | |
| 6,019,034 A | 2/2000 | Ford, Sr. | |
| 6,145,432 A | 11/2000 | Bellue, Jr. | |
| 6,332,193 B1 * | 12/2001 | Glass | ...................... G06F 21/32 713/170 |
| 6,349,889 B1 | 2/2002 | Sandolo | |
| 6,402,365 B1 | 6/2002 | Wong | |

(Continued)

FOREIGN PATENT DOCUMENTS

| | | |
|---|---|---|
| JP | H02/228920 A | 9/1990 |
| JP | 2006/149499 A | 6/2006 |

(Continued)

OTHER PUBLICATIONS

Hanssem, "Vacuum Blender Blending Raw Materials with No Wind Tunnel as Making Vacuum", <https://www.buykorea.org/product-details/vacuum-blender-Blending-raw-materials-with-no-Wind-Tunnel-as-making-vacuum--3047521.html>, retrieved on Dec. 27, 2016, BuyKorea.Org. (3 Pages).

*Primary Examiner* — Sharon Lynch
(74) *Attorney, Agent, or Firm* — Daniel C. Pierron; Widerman Malek PL

(57) ABSTRACT

A computer-implemented method for securing a trusted transaction using a biometric identity verification system comprising a peripheral device, a vendor server, and a verification server. The method may comprise the steps of receiving a biometric indicator at the peripheral device, and forwarding the biometric indicator to the vendor server. The method may further comprise forwarding the biometric indicator to the verification server which may verify the biometric indicator by translating the biometric indicator into an encryption value, and computing an identity verification flag, defined as a pulse upon detecting a match of the encryption value and a stored cypher record. The vendor server may execute the trusted transaction by receiving the pulse signifying a match of the encryption values found by the verification server.

14 Claims, 8 Drawing Sheets

(56) References Cited

U.S. PATENT DOCUMENTS

| | | | |
|---|---|---|---|
| 6,626,092 B2 | 9/2003 | Tarlow | |
| 6,920,561 B1* | 7/2005 | Gould | G06F 21/32 |
| | | | 713/156 |
| 7,246,555 B2 | 7/2007 | Small et al. | |
| 7,328,730 B2 | 2/2008 | Vilalta et al. | |
| 7,350,963 B2 | 4/2008 | Williams et al. | |
| 7,502,761 B2* | 3/2009 | Siegal | G06F 21/32 |
| | | | 705/64 |
| 7,506,818 B2* | 3/2009 | Beenau | G06F 17/30725 |
| | | | 235/380 |
| 8,960,578 B2 | 2/2015 | Byrne | |
| 9,330,511 B2* | 5/2016 | Webber | G06K 7/10297 |
| 2002/0129285 A1* | 9/2002 | Kuwata | G06F 21/32 |
| | | | 726/3 |
| 2002/0174067 A1* | 11/2002 | Hoffman | G06Q 20/04 |
| | | | 705/39 |
| 2003/0135740 A1* | 7/2003 | Talmor | G06F 21/32 |
| | | | 713/186 |
| 2003/0163383 A1* | 8/2003 | Engelhart | G06Q 20/02 |
| | | | 705/75 |
| 2004/0128249 A1* | 7/2004 | Hoffman | G06F 21/32 |
| | | | 705/44 |
| 2004/0173105 A1 | 9/2004 | Kim et al. | |
| 2004/0243856 A1* | 12/2004 | Shatford | G06F 21/32 |
| | | | 726/5 |
| 2005/0060556 A1* | 3/2005 | Jonas | G06F 21/32 |
| | | | 713/186 |
| 2005/0182717 A1* | 8/2005 | Engelhart | G06Q 20/02 |
| | | | 705/39 |
| 2006/0212407 A1* | 9/2006 | Lyon | G06Q 20/04 |
| | | | 705/71 |
| 2007/0016943 A1* | 1/2007 | M'Raihi | G06F 21/33 |
| | | | 726/9 |
| 2007/0056022 A1* | 3/2007 | Dvir | G06F 21/31 |
| | | | 726/4 |
| 2007/0180263 A1* | 8/2007 | Delgrosso | G06F 21/32 |
| | | | 713/186 |
| 2007/0198435 A1* | 8/2007 | Siegal | G06F 21/32 |
| | | | 705/67 |
| 2009/0164796 A1* | 6/2009 | Peirce | G06F 21/32 |
| | | | 713/186 |
| 2010/0131765 A1* | 5/2010 | Bromley | H04L 63/0414 |
| | | | 713/175 |
| 2010/0153738 A1* | 6/2010 | Jonas | G06F 21/32 |
| | | | 713/186 |
| 2011/0057034 A1* | 3/2011 | Maxwell | G06Q 20/346 |
| | | | 235/382 |
| 2011/0302644 A1* | 12/2011 | Headley | H04L 9/3271 |
| | | | 726/7 |
| 2013/0080789 A1* | 3/2013 | Headley | H04L 9/3271 |
| | | | 713/186 |
| 2013/0147603 A1* | 6/2013 | Malhas | G06K 9/00597 |
| | | | 340/5.83 |
| 2014/0137750 A1 | 5/2014 | Arai et al. | |
| 2014/0297438 A1* | 10/2014 | Dua | G06Q 20/20 |
| | | | 705/21 |
| 2014/0337634 A1* | 11/2014 | Starner | H04L 9/3231 |
| | | | 713/186 |
| 2015/0201808 A1 | 7/2015 | Katsuki et al. | |
| 2015/0244696 A1* | 8/2015 | Ma | H04L 63/08 |
| | | | 726/4 |
| 2015/0347734 A1* | 12/2015 | Beigi | G06F 21/32 |
| | | | 713/155 |
| 2016/0134599 A1* | 5/2016 | Ross | H04L 63/08 |
| | | | 713/168 |
| 2016/0267340 A1* | 9/2016 | Jensen | G06K 9/00288 |
| 2017/0076294 A1* | 3/2017 | Kojima | G06Q 20/40145 |
| 2017/0154344 A1* | 6/2017 | Benson | G06Q 30/0185 |
| 2018/0034796 A1* | 2/2018 | Ross | H04W 12/06 |

FOREIGN PATENT DOCUMENTS

| | | |
|---|---|---|
| JP | 2008/206907 A | 9/2008 |
| WO | WO 2013/143430 A1 | 10/2013 |
| WO | WO 2004/054301 A1 | 4/2014 |
| WO | WO 2015/194750 A1 | 12/2015 |

* cited by examiner

BIOMETRIC IDENTIFICATION SYSTEM AND ASSOCIATED METHODS

FIELD OF THE INVENTION

The present invention relates to the field of biometrics authentication and, more specifically, to systems and methods for verifying identity for access control in an online environment using biometrics.

BACKGROUND

Customer-facing computing systems, such as point of sale (POS) systems and automated access control systems, commonly incorporate security mechanisms designed to reduce losses by boosting accuracy and security for the trusted transactions those systems support. Toward this end, some organizations have sought to leverage biometric technology to improve convenience, satisfaction, security, and profitability.

For example, organizations such as theme parks may use biometric technology in the form of fingerprint readers to allow authorized guests to more easily re-enter theme parks, while at the same time reducing ticket fraud by preventing unauthorized use of theme park tickets. Also for example, organizations such as casinos may use biometric technology in the form of facial recognition to improve customer loyalty programs while reducing casino risks by identifying card counters, cheaters, and even gambling addicts. Also for example, government organizations may use biometric technology to improve targeted services such as identification cards, benefits programs, background checks, passenger screening, suspect identification, and visitor tracking.

Each of the previously mentioned uses of biometric technology is a form of user identification. Such use allows an organization to identify a person by matching the biometric indicator to a previously-recorded biometric indicator to verify that person's identity claim. Biometric indicators may be defined as features that are expected to be unique to a single person. For example, biometric indicators may be either physiological or behavioral. Physiological biometric indicators include deoxyribonucleic acid (DNA), facial features, fingerprints, iris, voice, and hand geometry, as well as other measurable physical traits. Behavioral biometric indicators include gait, speech patterns, and typing patterns, as well as other measurable behavioral traits.

Biometric technology has become popular because of its utility for authorizing users to gain access to a resource while denying unauthorized users access to that resource. Many biometric indicators, such as fingerprints, may be captured without inconvenience to the user and may even be collected without the user's knowledge or consent. However, the fact that biometric indicators can be easily and quickly measured is also the biggest threat to using biometric indicators as an authentication trigger. Specifically, biometric indicators may be difficult to keep secure. For example, the fact that biometric indicators are largely immutable and vulnerable, they may be at risk of being compromised, lost, or stolen. For similar reasons, recovery from a biometric indicator breach may be difficult.

Given the sensitivity of biometric indicators to breach, maintaining the trusted nature of biometric capture equipment is often important. Such trusted equipment deployed in a networked environment is often uniquely addressable using an identifier standard commonly employed in software construction, often referred to as a universally unique identifier (UUID) or, alternatively, as a globally unique identifier (GUID). The intent of UUIDs is to enable distributed systems to uniquely identify information without significant central coordination.

For purposes of this disclosure, the word "unique" should be taken to mean "practically unique" rather than "guaranteed unique". For example, and without limitation, a UUID may comprise a 128- or 256-bit value, the meaning of each bit of which may be defined by any of several variants so as to achieve practical uniqueness across space and time. That is, because the identifiers have a finite size, it is possible for two differing items to share the same identifier, which is a form of hash collision. The identifier size and generation process need to be selected so as to make collision sufficiently improbable in practice. A UUID for a device should be created so as to establish reasonable confidence that the same identifier will never be unintentionally created to identify some other device. Information labeled with UUIDs can therefore be later combined into a single database without needing to resolve identifier conflicts.

To further reduce the chances of collision, a "guaranteed" UUID may contain a reference to the network address of the trusted equipment that generated the UUID, a timestamp (e.g., a record of the precise time of a transaction request), and a randomly generated component. Because the network address identifies a unique device, and the timestamp is unique for each UUID generated from a particular host, those two components are considered in the computing industry to sufficiently ensure uniqueness. A randomly generated element of the UUID may be added as a protection against any unforeseeable problem.

Also for purposes of definition, an Internet Protocol address (IP address) is a numerical label assigned to an automated device (e.g., computer, printer) configured to participate in a computer network that uses the Internet Protocol for communication. An IP address serves two principal functions: host or network interface identification, and location addressing.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention relate to computer-implemented systems and methods for securing a trusted transaction using a biometric identity verification system that includes a peripheral device, a vendor server, and a verification server. Each device in the system may be characterized by a respective computer processor and by a respective non-transitory computer-readable storage medium.

A biometric scanner application executed by the peripheral device may receive a biometric indicator as part of an identity claim. A communication subsystem executed by the vendor server may receive, either separately or concurrently, the biometric indicator and a device identifier for the peripheral device. The communication subsystem may reject the identity claim if the device identifier (e.g., a universally unique identifier (UUID)) does not match a known identifier for a trusted system (e.g, a trusted IP address).

An account management subsystem executed by the verification server may, after receiving the biometric indicator and the Vendor Server identifier, use an identity verification subsystem to verify the biometric indicator by translating the biometric indicator into an encryption value, and creating, upon detection of a first match of the encryption value and a stored cypher record, an identity verification pass, defined as a pulse. An authorization subsystem executed by the vendor server may authorize the trusted transaction associated with the identity claim upon receiving the pulse.

The account management subsystem executed by the verification server may receive an IP address associated with the vendor server or another type of vendor identification, and may associate (i.e., register) that vendor IP address or vendor ID to a previously-unsaved cypher record or to a matched cypher record. The transaction subsystem of the vendor server, upon detecting a cypher record match, may create a transaction access pass and/or may execute the trusted transaction.

DETAILED DESCRIPTION OF THE INVENTION

Figure 1:
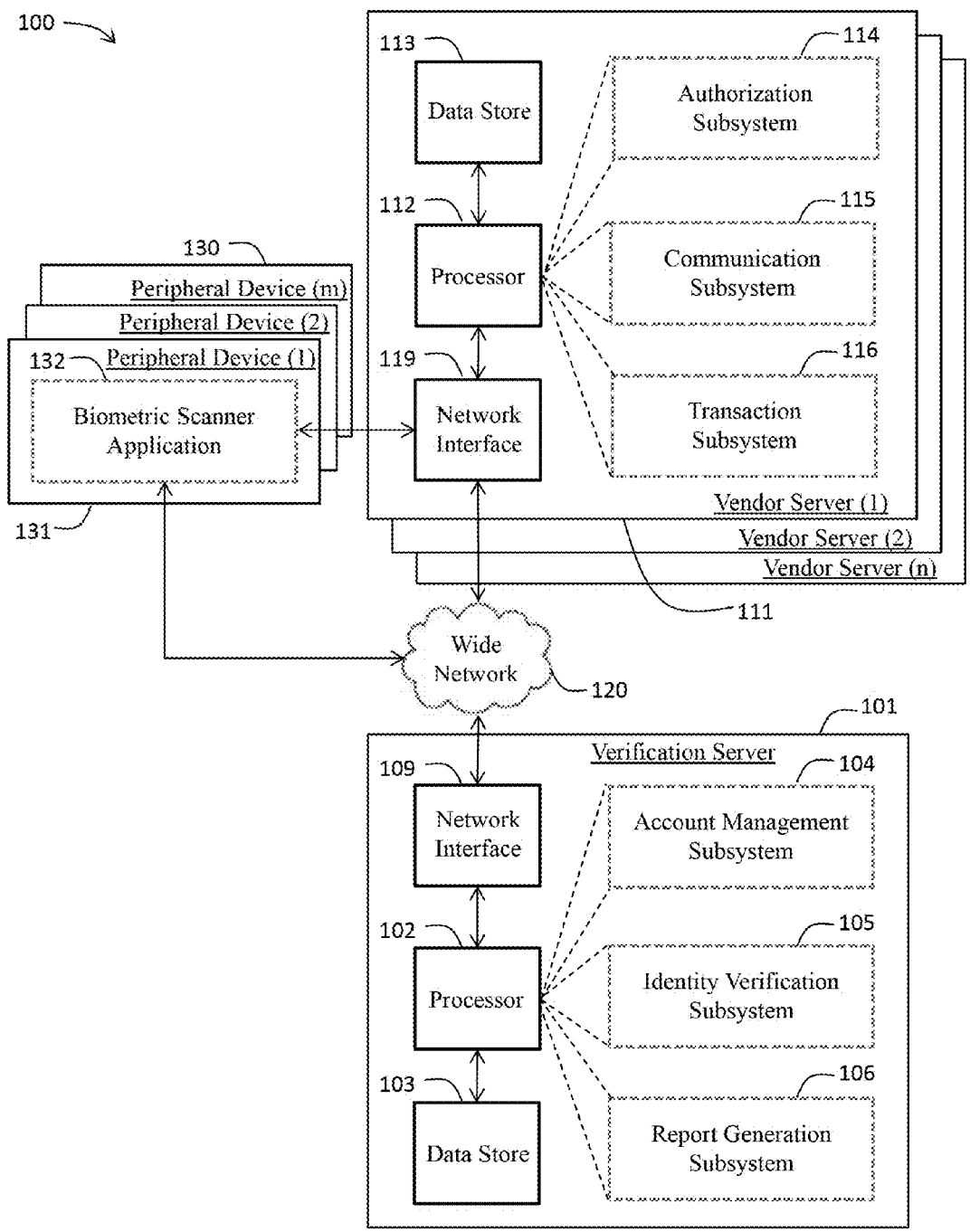
FIG. 1 is a schematic block diagram of a biometric identity verification system according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1-7, a biometric identity verification system according to an embodiment of the present invention is now described in detail. Throughout this disclosure, the present invention may be referred to as an online identification system, an identification system, a biometric verification system, a biometric system, a verification system, a verification service, a verifier, a device, a system, a product, a service, and a method. Those skilled in the art will appreciate that this terminology is only illustrative and does not affect the scope of the invention. For instance, the present invention may just as easily relate to physical access control and computing forensics technology.

Example systems and methods for a biometric identity verification system are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

An embodiment of the invention, as shown and described by the various figures and accompanying text, provides a biometric identity verification system comprising a peripheral device, a vendor server, and a verification server configured to operate to verify identity claims using biometric indicators, and such that algorithms executed on the vendor server and the verification server, respectively, cooperate to secure the biometric indicators from breach.

Referring more specifically to FIG. 1, for example, and without limitation, a Biometric Identity Verification System 100, according to an embodiment of the present invention, may include a Verification Server 101, which may be in data communication with a Vendor Server 111. Two or more of each of the Peripheral Device(s) 130 and the Vendor Server(s) 111 may be coupled using via a network connection to a wide area network 120, such as the Internet. Similarly, two or more of each of the Vendor Server(s) 111 and the Verification Server(s) 101 may be coupled using via a network connection to a wide area network 120, such as the Internet. A Peripheral Device 130 also may be directly coupled to a Vendor Server 111 as described below in more detail.

Figure 3A:
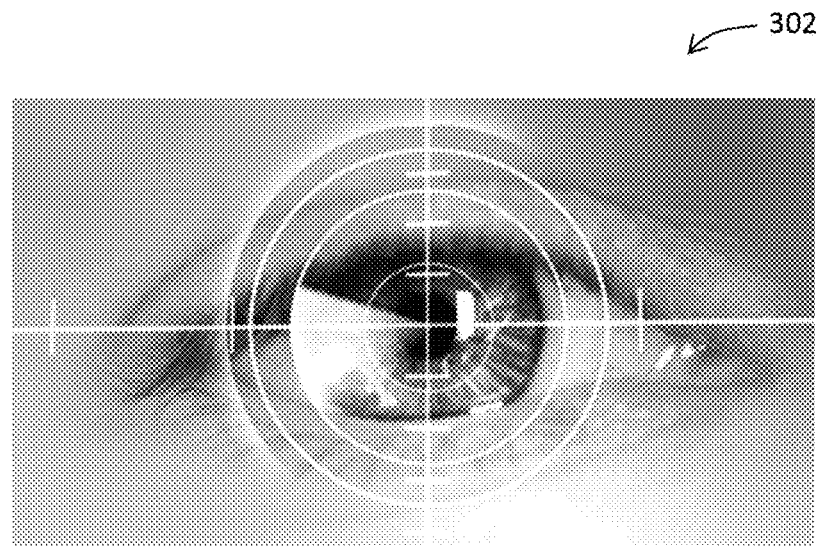
FIGS. 3A, 3B, and 3C are illustrations of exemplary pattern analysis graphs applied to an iris biometric, a fingerprint biometric, and a voice biometric, respectively, as generated by a biometric identity verification system according to an embodiment of the present invention.
Figure 3B:
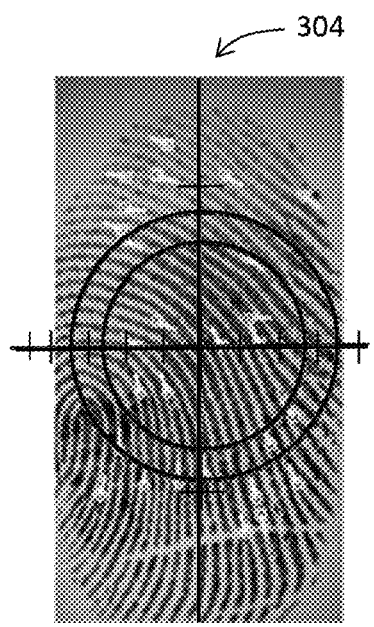
Figure 3C:
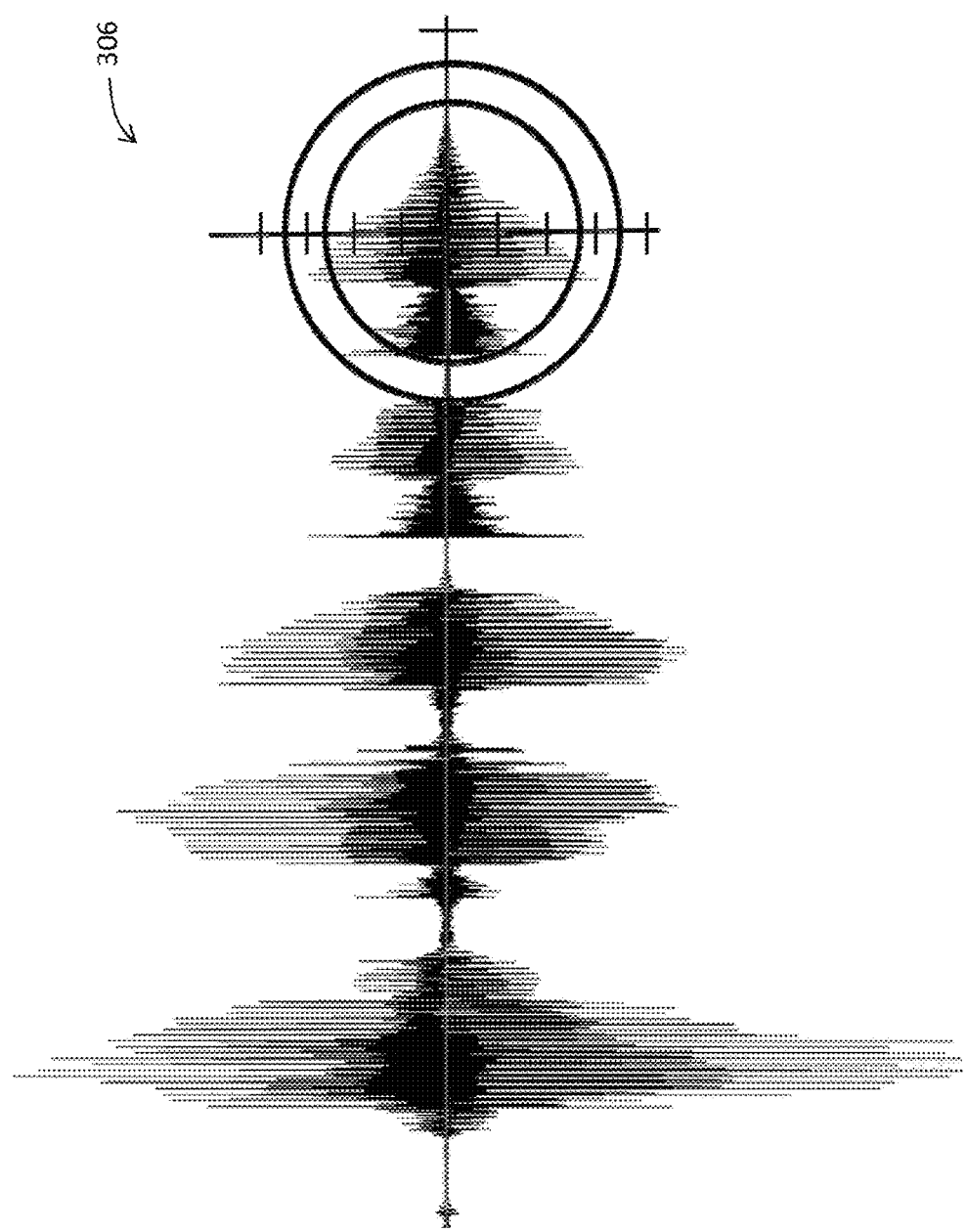

The Peripheral Device 130 may comprise a biometric scanning device 131. For example, and without limitation, the biometric scanning device 131 may employ a Biometric Scanner Application 132 operable to acquire a mathematical image of a user's unique physical or behavioral trait (e.g., a biometric indicator). Referring additionally to FIGS. 3A, 3B, and 3C, biological indicators captured and processed by the biometric scanning device 131 may include one or more of iris patterns 302, fingerprint patterns 304, and voice patterns 306.

A user of the biometric scanning device 131 may be a prospective or current consumer of protected data and/or functions made available by a service provider (e.g., vendor). A consumer may interact with various servers included in the Biometric Identity Verification System 100 through the Peripheral Device 130. For example, and without limitation, consumers may include any individual seeking access to protected data. automated systems, and/or restricted access areas or facilities. Also for example, and without limitation, consumers may include any individuals or companies desiring to conduct business transactions online using an e-commerce webpage.

Continuing to refer to FIG. 1, the Vendor Server 111 may comprise a web host that is operable for online transaction processing (OLTP). For example, and without limitation, services typically provided by a Vendor Server 111 may include virtual storefronts, online marketplaces, demographic data gathering, electronic data interchange, online marketing, secure business transactions, and access to restricted areas or facilities. Such services typically manipulate content to which access is restricted, either by privacy policy (e.g., social networking websites) or by commercial necessity (e.g., e-commerce websites).

The Vendor Server 111 may include a web host that is operable to provide authentication services that secure trusted transactions that may be initiated using the Peripheral Device 130. For example, and without limitation, the Vendor Server 111 may be queried to determine if a requesting individual is authorized to perform a requested electronic transaction. Although such an authentication event may serve to establish a baseline level of confidence in a user's identity claim electronically presented to the Vendor Server 111, subscription to a credential service provided by a trusted registration authority is commonly employed to further verify an identity claim and, thereby, increase the level of confidence in the identity claim. Such a registration authority, often referred to as a credential service provider (CSP), may employ the Verification Server 101 of the Biometric Identity Verification System 100 for this purpose.

For example, and without limitation, the Vendor Server 111 may comprise a processor 112 that may be operable to accept and execute computerized instructions, and also a data store 113 which may store data and instructions used by the processor 112. More specifically, the processor 112 may be positioned in data communication with some number of Verification Servers 101 and also with some number of Peripheral Devices 130. The processor 112 may be operable to direct input from other components of the Biometric Identity Verification System 100 to the data store 113 for storage and subsequent retrieval. For example, and without limitation, the processor 112 may be in data communication with external computing resources, such as the Peripheral Device 130 and the Verification Server 101, through a respective direct connection and/or through a network connection to the wide area network 120 facilitated by a network interface 119.

Authorization Subsystem 114 instructions, Communication Subsystem 115 instructions, and Transaction Subsystem 116 instructions may be stored in the data store 113 and retrieved by the processor 112 for execution. The Authorization Subsystem 114 may be operable to advantageously receive and analyze access request data and/or transaction request data submitted from a Peripheral Device 130 by the requesting party (e.g., user) who is making an identity claim. The Communication Subsystem 115 may be operable to advantageously facilitate automated interaction with trusted systems (e.g., Peripheral Devices 130 of a trusted system type) and with credential service providers (e.g., Verification Server 101). The Transaction Subsystem 116 may be operable to advantageously perform a trusted transaction for the requesting party upon authorization and/or verification of the identity of the requesting party.

Continuing to refer to FIG. 1, the Verification Server 101 may comprise a processor 102 that may be operable to accept and execute computerized instructions, and also a data store 103 which may store data and instructions used by the processor 102. More specifically, the processor 102 may be positioned in data communication with some number of Vendor Servers 111 which, in turn, may be positioned in data communication with some number of Peripheral Devices 130. The processor may be configured to direct input from other components of the Biometric Identity Verification System 100 to the data store 103 for storage and subsequent retrieval. For example, and without limitation, the processor 102 may be in data communication with external computing resources, such as the Vendor Server 111, through a direct connection and/or through a network connection to the wide area network 120 facilitated by a network interface 109.

Account Management Subsystem 104 instructions, Identity Verification Subsystem 105 instructions, and Report Generation Subsystem 106 instructions may be stored in the data store 103 and retrieved by the processor 102 for execution. The Account Management Subsystem 104 may be operable to create and maintain verification accounts for vendors seeking credential services. The Identity Verification Subsystem 105 may be operable to respond to an authentication and/or transaction request with an indication of the veracity of the requestor's identity claim (defined as a pulse). The Report Generation Subsystem 106 may be operable to format and display verification metrics and system-health indicators.

Those skilled in the art will appreciate that the present invention contemplates the use of computer instructions that may perform any or all of the operations involved in identity verification, including access request and transaction request processing, authentication services, verification services, personal identification information collection and storage, and trusted transaction risk processing. The disclosure of computer instructions that include Authorization Subsystem 114 instructions, Communication Subsystem 115 instructions, Transaction Subsystem 116 instructions, Account Management Subsystem 104 instructions, Identity Verification Subsystem 105 instructions, and Report Generation Subsystem 106 instructions is not meant to be limiting in any way. Those skilled in the art will readily appreciate that stored computer instructions may be configured in any way while still accomplishing the many goals, features and advantages according to the present invention.

Continuing to refer to FIG. 1, and referring additionally to FIG. 2, a data structure 207 present on a Peripheral Device 130 will now be discussed. For example, and without limitation, the Peripheral Device 130 may use the Biometric Scanner Application 132 to scan a biological trait of a person making an identity claim, and to produce a numeric representation of the biological trait (i.e., biometric indicator 212). In one embodiment of the present invention, the Peripheral Device 130 may maintain a UUID 210 that may comprise a hardware identifier and, optionally, a hash value.

Continuing to refer to FIGS. 1 and 2, a data structure 208 present on a Vendor Server 111 will now be discussed. For example, and without limitation, the Vendor Server 111 may use the Communication Subsystem 115 to receive the biometric indicator 212 from the Peripheral Device 130, as well as that device's UUID 210, and to store representations of these two values on the Vendor Server 111 as data structures 222 and 212, respectively. Upon the transmission of at least one of data structures 222 and 212 to the Verification Server 101, the Vendor Server 111 may, and in some embodiments does, delete both data structures 222 and 212 if they are present on the Vendor Server 111. In one embodiment of the present invention, the Vendor Server 111 may also use the Authorization Subsystem 114 to recognize the Peripheral Device 130 as a trusted resource, and to process verification guidance received from, for example, and without limitation, a CSP. The Vendor Server 111 may also maintain an IP address 224 that may uniquely label that server (the label defined as a Vendor Server ID) on the network. In some embodiments, the Vendor Server ID may be some other type of identifier other than the IP address 224.

Continuing to refer to FIGS. 1 and 2, a data structure 209 present on a Verification Server 101 will now be discussed. For example, and without limitation, the Verification Server 101 may use the Account Management Subsystem 104 to receive the biometric indicator 212 from the Vendor Server 111, as well as an association of the biometric indicator 212 to a Vendor ID 224, such as an IP address or other identifier of the Vendor Server 111. The Account Management Subsystem 104 may compare the Vendor ID 224 received as part of the identity claim and compare it to a Vendor ID 234 comprised by the Verification Server 101 to ensure a match. In one embodiment of the present invention, the Verification Server 101 may also use the Identity Verification Subsystem 105 to translate the biometric indicator 212 into an encryption value 232, and to apply a verification algorithm to that encryption value 232 to produce a verification pass-or-fail flag (i.e., pulse) for return to the Vendor Server 111.

Figure 2:
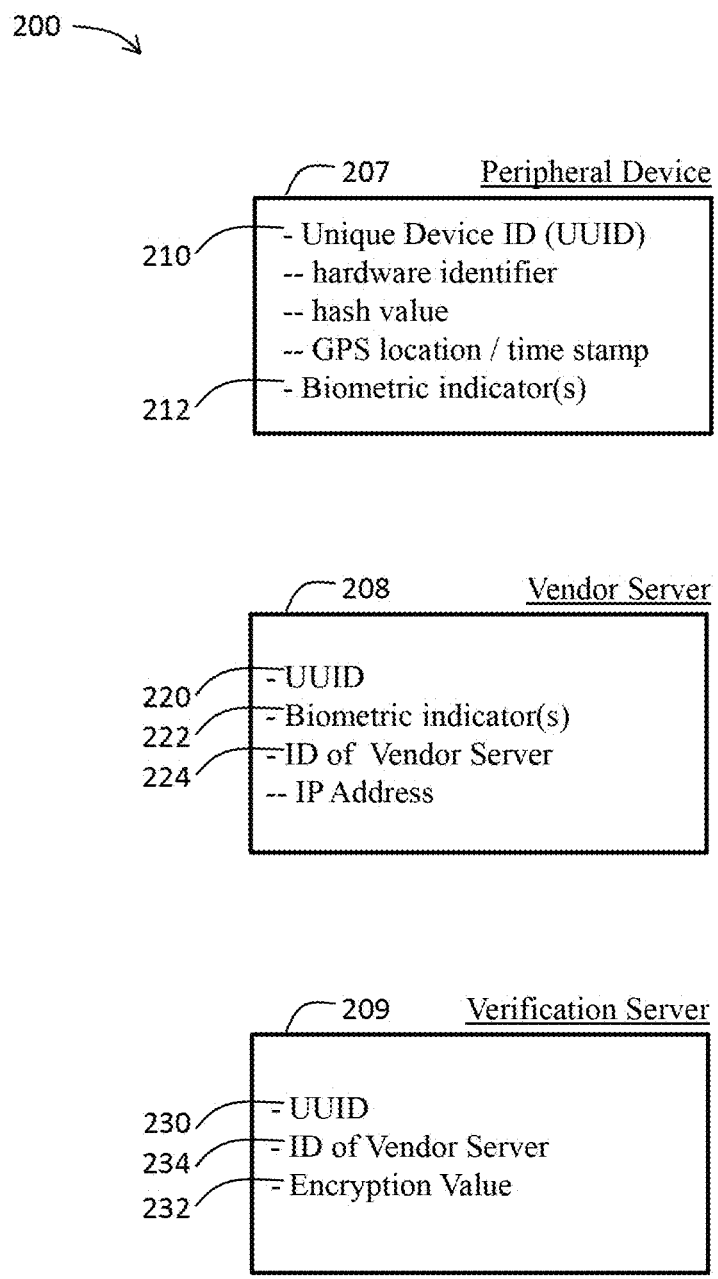
FIG. 2 is an illustration of exemplary data structures maintained and used by the biometric identity verification system depicted in FIG. 1.
Figure 4:
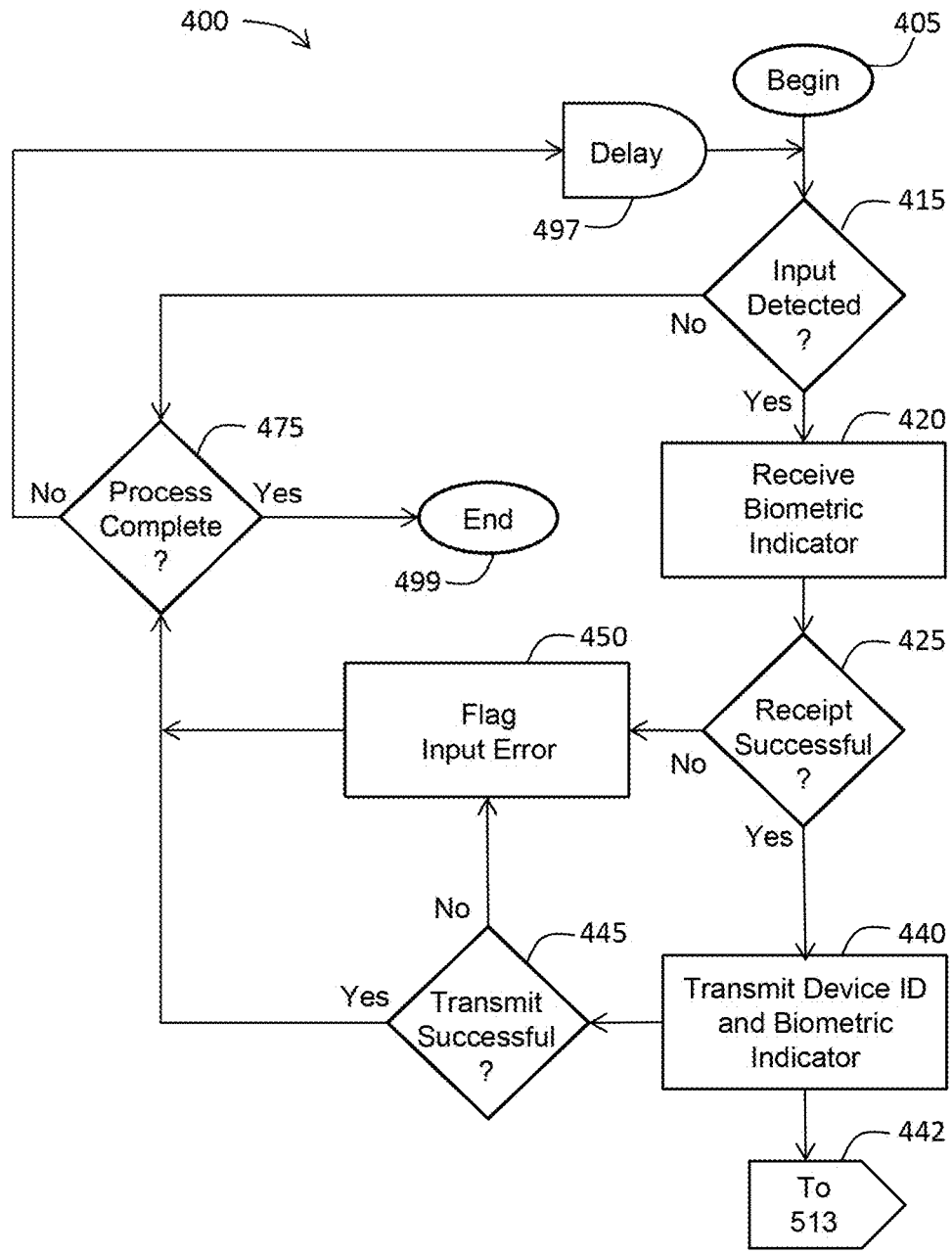
FIG. 4 is a flow chart detailing a method of authentication event processing by a peripheral device as used in connection with a biometric identity verification system according to an embodiment of the present invention.

Referring now to FIG. 4, and continuing to refer to FIGS. 1 and 2, a method aspect of performing a trusted transaction using the Peripheral Device 130 of the Identity Verification System 100, according to an embodiment of the present invention, is presented. For example, and without limitation, a user may interact with the Peripheral Device 130 to prompt authentication and verification control guidance from the Vendor Server 111 and/or the Verification Server 101. More specifically, the user may use the Peripheral Device 130 to generate an access/transaction request (hereinafter, a "user request") and to transmit that request through the wide area network 120 to the Vendor Server 111.

For example, and without limitation, from the start at Block 405, the Biometric Scanner Application 132 of the Peripheral Device 130 may poll for input (Block 415). Polling may entail checking for input and, upon detecting no input at Block 415, enforcing a timed delay (Block 497) before input checking again. If during polling the automated method receives a call to complete (Block 475), the process ends at Block 499.

Upon detection of scanned biometric input at Block 415, the method may operate at Block 420 to capture a mathematical image of a biological trait of the user (hereinafter, the biometric indicator 212). A person of ordinary skill in the art will immediately recognize that the Peripheral Device 130 and/or a plurality of Peripheral Devices 130 may operate to capture more than one biometric indicator 212 for subsequent transmission to the Vendor Server 111 for further processing. Also, the biometric indicator 212 may include a multi-factor biometric indicator comprising, for example, and without limitation, some combination of voice (FIG. 3C), iris (FIG. 3A), and fingerprint (FIG. 3B) images. Similarly, the method may capture other data as part of a user request, such as a username, a password, and/or responses to fact-based questions (such as a mother's maiden name).

If an attempt to receive the biometric indicator 212 at Block 420 is determined to be unsuccessful (Block 425), then the Biometric Scanner Application 132 may flag the input error (Block 450) before returning to input polling. Upon successful receipt of the biometric indicator at Block 425, the Biometric Scanner Application 132 may, at Block 440, transmit an identity claim (comprising the biometric indicator 212 and the UUID 210 of the Peripheral Device 130) to the Vendor Server 111 for further processing (Block 442). Before returning to input polling, the Biometric Scanner Application 132 may confirm successful transmission of the identity claim (Block 445). Depending on the result of this transmission check, the Biometric Scanner Application 132 may optionally flag the input error (Block 450) before returning to input polling.

Figure 5:
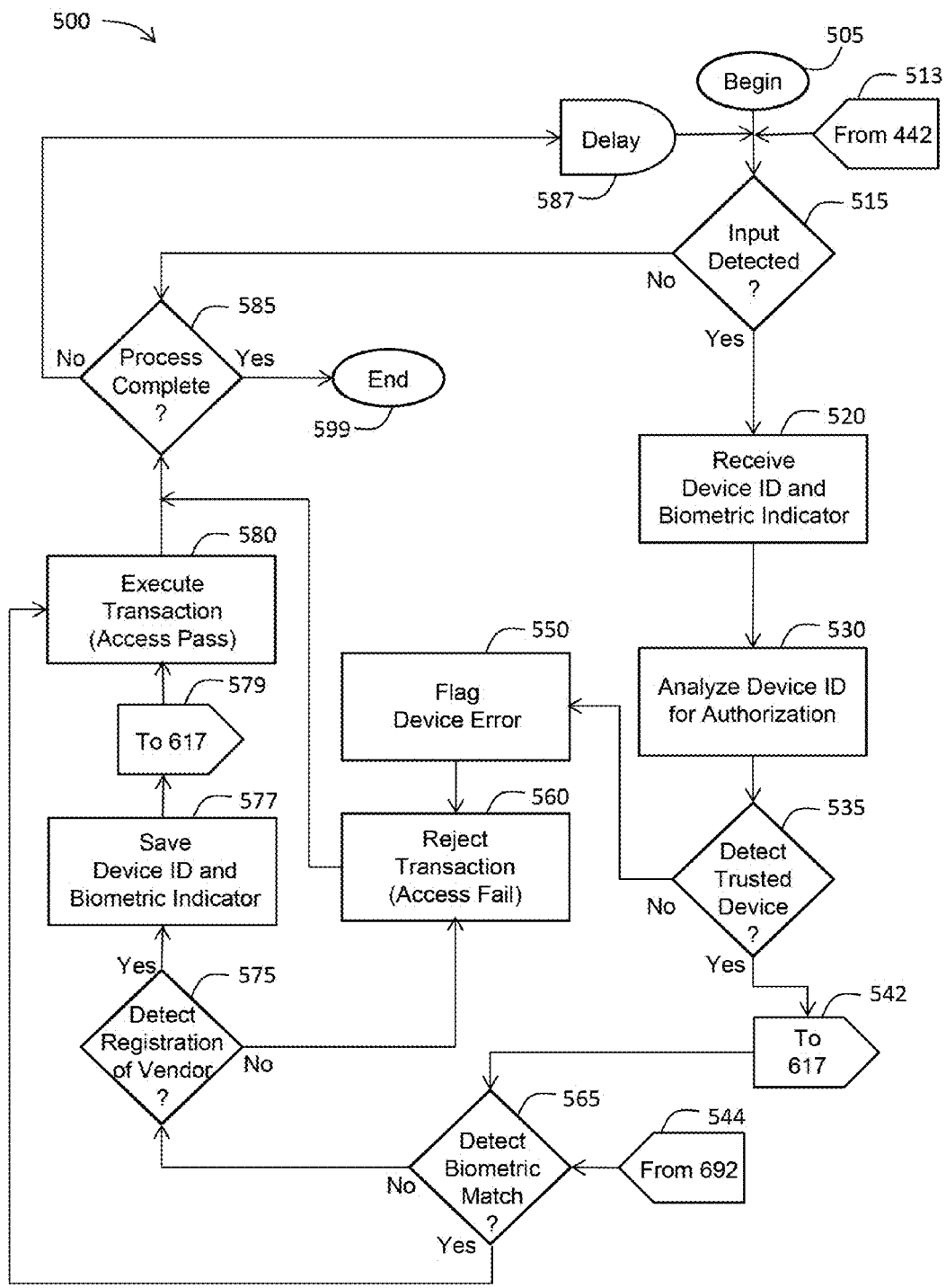
FIG. 5 is a flow chart detailing a method of authentication event processing by a vendor server as used in connection with a biometric identity verification system according to an embodiment of the present invention.

Referring now to FIG. 5, and continuing to refer to FIGS. 1 and 2, a method aspect of executing a trusted transaction using the Vendor Server 111 of the Identity Verification System 100, according to an embodiment of the present invention, is discussed. For example, and without limitation, the Vendor Server 111 may interact with the Peripheral Device 130 to authenticate trusted hardware and to solicit verification control guidance from the Verification Server 101. More specifically, the Vendor Server 111 may manage verification of an identity claim submitted from the Peripheral Device 130 to support the user's trusted transaction request entered at the Peripheral Device 130.

From the start at Block 505, the Communication Subsystem 115 of the Vendor Server 111 may poll for input (Block 515). For example, and without limitation, at Block 513 the Communication Subsystem 115 may monitor a data channel (e.g., the interface 119 to the wide area network 120) for input. Polling may entail checking for input and, upon detecting no input at Block 515, enforcing a timed delay (Block 587) before input checking again. If during polling the automated method receives a call to complete (Block 585), the process ends at Block 599.

Upon detection of input at Block 515, the method may operate at Block 520 to receive the biometric indicator 222 and UUID 220. At Block 530, the Authorization Subsystem 114 may analyze the input UUID 220 to determine if the Peripheral Device 130 transmitting the biometric indicator 222 is a trusted system. For example, and without limitation, biometric scanner hardware that is correlated to the servicing vendor (e.g., UUID 220 correlated to IP address 224 on Vendor Server 111) may qualify as a trusted system.

If, at Block 535, the received UUID 220 is determined not to be that of a trusted system, then the Authorization Subsystem 114 may flag the device error (Block 550) and then execute, using the Transaction Subsystem 116, a rejection of the requested transaction (e.g., a transaction access failure message) (Block 560) before returning to input polling. Upon successful identification of the UUID 220 as that of a trusted device at Block 535, the Authorization Subsystem 114 may, at Block 542, transmit the identity claim (comprising the biometric indicator 222 and the Vendor ID 224) to the Verification Server 101 for further processing, as described in detail below. The Authorization Subsystem 114 may subsequently receive from the Verification Server 101 (Block 544) a verification pass-or-fail flag (i.e., a pulse) as an indication of whether the augmented identity claim matches a verification record maintained by the Verification Server 101.

For example, and without limitation, if at Block 565 a biometric match was found by the Verification Server 101, then the Authorization Subsystem 114 may signal transaction access approval, or pass (Block 580), before returning to input polling. In one embodiment of the present invention, successful verification at Block 565 may activate the Transaction Subsystem 116 to service the automated request (Block 580) initiated from the trusted Peripheral Device 130.

Continuing to refer to FIG. 5, if at Block 565 no biometric match was found by the Verification Server 101, and subsequently, at Block 575, no past registration of the vendor was detected by the Verification Server 101, then at Block 560 the Authorization Subsystem 114 may reject the requested transaction (Block 560) before returning to input polling. Conversely, if past registration of the vendor is detected (Block 575), then the Authorization Subsystem 114 may transmit the identity request records (Block 577) to the Verification Server 101 (Block 579) to be saved as a new account for future verification purposes. The Authorization Subsystem 114 then may execute the requested transaction (Block 580), before returning to input polling. A person of ordinary skill in the art will immediately recognize that multiple vendors may each respond uniquely to a pulse, either negative or positive.

Figure 6:
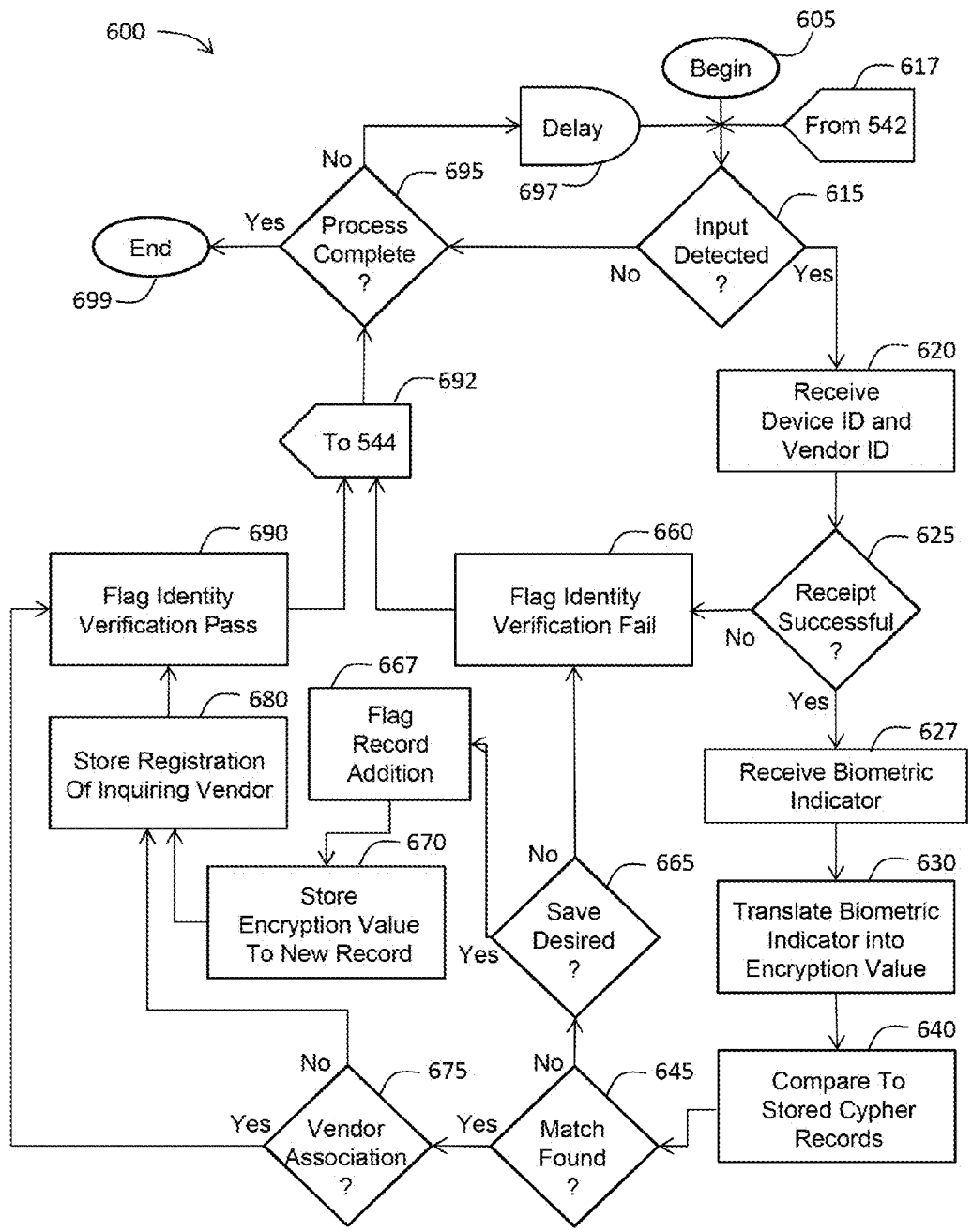
FIG. 6 is a flow chart detailing a method of authentication event processing by a verification server as used in connection with a biometric identity verification system according to an embodiment of the present invention.

Referring now to FIG. 6, and continuing to refer to FIGS. 1 and 2, a method aspect of securing a trusted transaction using the Verification Server 101 of the Identity Verification System 100, according to an embodiment of the present invention, is discussed. For example, and without limitation, the Verification Server 101 may interact with the Vendor Server 111 to provide verification control guidance while maintaining data security for input biometric indicators. More specifically, the Verification Server 101 may manage a history of submitted biometric indicators, and may employ those historical records to verify an augmented identity request submitted from account-holding Vendor Servers 111.

For example, and without limitation, from the start at Block 605, the Account Management Subsystem 104 of the Verification Server 101 may poll for input (Block 615). For example, and without limitation, at Block 617 the Account Management Subsystem 104 may monitor a data channel (e.g., the interface 109 to the wide area network 120) for input. Polling may entail checking for input and, upon detecting no input at Block 615, enforcing a timed delay (Block 697) before input checking again. If during polling the automated method receives a call to complete (Block 695), the process ends at Block 699.

Upon detection of input at Block 615, the method may operate at Block 620 to receive the Vendor ID 224. If, at Block 625, the received input is determined to be of an unrecognized format and/or is otherwise errant (e.g., Vendor ID 224 doest not match with a Vendor ID 234 of an account-holding vendor), then the Account Management Subsystem 104 may flag the error (Block 660) and may transmit to the Vendor Server 111 an identity verification failure message, in the form of a pulse, (Block 692) before returning to input polling. For example, and without limitation, logs of requests for service (including errant requests, as described above) may be recorded in the data store 103 for subsequent retrieval and reporting by the Report Generation Subsystem 106.

Upon successful input receipt at Block 625, the Identity Verification Subsystem 105 may receive the biometric indicator 212 (Block 627) and translate the biometric indicator 212 into an encryption value 232 using a locally-loaded and secure cypher (Block 630). For example, and without limitation, the encryption value 232 may include no information about the inquiring vendor, resulting in any user having the same encryption value 232, regardless of vendor through whom the user makes an identity claim. Such formatting of the encryption value 232 may allow for manipulation and comparison without exposing its original contents (e.g., biometric indicator 212) to breach.

At Block 640, the Identity Verification Subsystem 105 may compare the encryption value 232 to stored records captured during previous transaction verification actions. If the encryption value 232 is found to match a verification record maintained by the Verification Server 101 (Block 645), the Identity Verification Subsystem 105 may determine if the matching verification includes an association of the encryption value 232 with a vendor (Block 675). If an association with the requesting vendor exists, the Identity Verification Subsystem 105 may flag an identity verification success (Block 690) and return to the Vendor Server 111 notice of the biometric match found by the Verification Server 101 (Block 692), in the form of a pulse, before returning to input polling. If at Block 675 no vendor association exists, then the Identity Verification Subsystem 105 may store an association of the encryption value 232 with the inquiring vendor (Block 680) before flagging an identity verification success (Block 690) and returning to the Vendor Server 111 notice of the biometric match (Block 692), in the form of a pulse, before returning to input polling.

If the encryption value 232 is found to not match a verification record maintained by the Verification Server 101 (Block 645), then at Block 665 the Identity Verification Subsystem 105 may determine if the inquirer (e.g., user, vendor) has directed that unmatched encryption values 232 be saved to the data store 103 (see FIG. 5 at Block 577). If no such save direction exists, then the Identity Verification Subsystem 105 may flag the match error (Block 660) and transmit to the Vendor Server 111 an identity verification failure message (Block 692), in the form of a pulse, before returning to input polling. If a save direction does exist, then the Identity Verification Subsystem 105 may flag the addition of a record to the data store 103 by transmitting a message to the Vendor Server 111 (Block 667), store the encryption value 232 as a new record in the data store 103, and also an association of the encryption value 232 with the inquiring vendor (Block 680) before flagging an identity verification success (Block 690), returning to the Vendor Server 111 notice of the biometric match (Block 692) in the form of a pulse, and returning to input polling.

Figure 7:
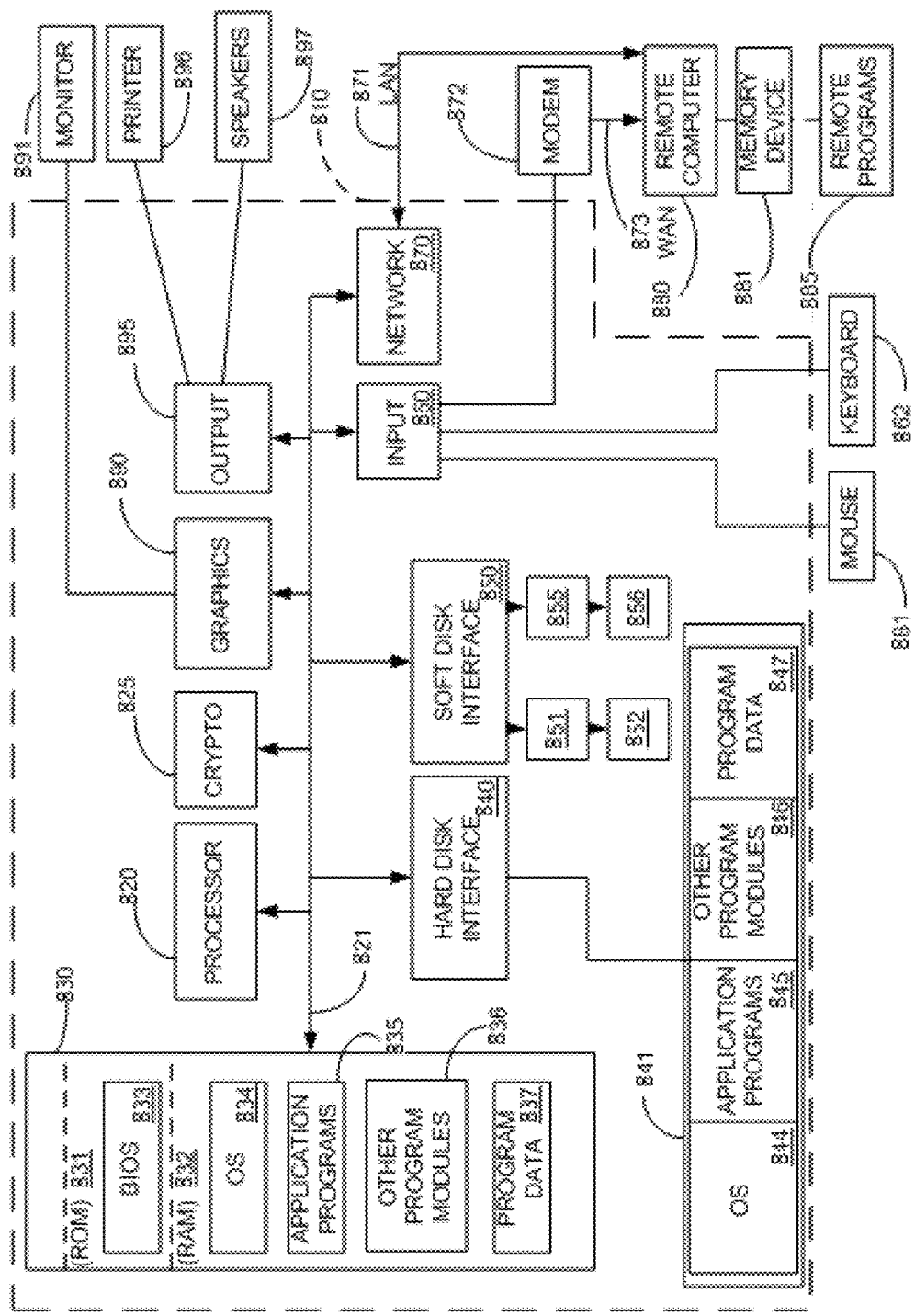
FIG. 7 is a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 7 illustrates a model computing device in the form of a computer 810, which is capable of performing one or more computer-implemented steps in practicing the method aspects of the present invention. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 810 may also include a cryptographic unit 825. Briefly, the cryptographic unit 825 has a calculation function that may be used to verify digital signatures, calculate hashes, digitally sign hash values, and encrypt or decrypt data. The cryptographic unit 825 may also have a protected memory for storing keys and other secret data. In other embodiments, the functions of the cryptographic unit may be instantiated in software and run via the operating system.

A computer 810 typically includes a variety of computer readable media. Computer readable media can be any available media that can be accessed by a computer 810 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates an operating system (OS) 834, application programs 835, other program modules 836, and program data 837.

The computer 810 may also include other removable/non-removable, volatile/nonvolatile computer storage media. By way of example only, FIG. 7 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives, and their associated computer storage media discussed above and illustrated in FIG. 7, provide storage of computer readable instructions, data structures, program modules and other data for the computer 810. In FIG. 7, for example, hard disk drive 841 is illustrated as storing an OS 844, application programs 845, other program modules 846, and program data 847. Note that these components can either be the same as or different from OS 834, application programs 835, other program modules 836, and program data 837. The OS 844, application programs 845, other program modules 846, and program data 847 are given different numbers here to illustrate that, at a minimum, they may be different copies. A user may enter commands and information into the computer 810 through input devices such as a keyboard 862 and cursor control device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a graphics controller 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 7. The logical connections depicted in FIG. 7 include a local area network (LAN) 871 and a wide area network (WAN) 873, but may also include other networks 140. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on memory device 881.

The communications connections 870 and 872 allow the device to communicate with other devices. The communications connections 870 and 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Those skilled in the art will appreciate that the present invention contemplates the use of data structures that may store information supporting any or all of the operations involved in delivering authentication and verification services. The disclosure of the exemplary data structures above is not meant to be limiting in any way. Those skilled in the art will readily appreciate that data structures may include any number of additional or alternative real world data sources, and may be configured in any way while still accomplishing the many goals, features and advantages according to the present invention.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method of operating a biometric identity verification system comprising a peripheral device, a vendor server, and a verification server, characterized by a respective computer processor and by a respective non-transitory computer-readable storage medium defining a plurality of non-transitory computer-readable storage media that comprise a plurality of instructions which, when executed by the plurality of computer processors, perform the method comprising:
    receiving, using a biometric scanner application executed on the peripheral device, an identity claim comprising a biometric indicator;
    receiving, using a communication subsystem executed on the vendor server, the biometric indicator and a device identifier for the peripheral device;
    verifying using the communication subsystem on the vendor server that the peripheral device is a trusted system by correlating the device identifier with a vendor server ID of the vendor server;
    transmitting, using an authorization subsystem executed on the vendor server, an identity claim comprising the biometric indicator and a vendor server ID to the verification server and then erasing the biometric indicator and device identifier from the vendor server;
    receiving, using an account management subsystem executed by the verification server, the biometric indicator and a vendor server ID;
    verifying, using the account management subsystem executed on the verification server, the vendor server ID matches a stored vendor server ID for the vendor server;
    verifying, using an identity verification subsystem executed on the verification server, the biometric indicator by
        translating the biometric indicator into an encryption value, and
        creating, upon detecting a first match of the encryption value and one of a plurality of stored cypher records, defined as a matched cypher record, an identity verification flag, defined as a pulse; and
    authorizing, using the authorization subsystem executed by the vendor server, a trusted transaction associated with the identity claim by receiving the pulse.

2. The method according to claim 1 wherein the device identifier comprises a universally unique identifier (UUID).

3. The method according to claim 1 wherein the vendor server ID is an IP address associated with the vendor server.

4. The method according to claim 1 wherein verifying the biometric indicator further comprises associating the vendor server ID to the matched cypher record.

5. The method according to claim 1 wherein verifying the biometric indicator further comprises:
    storing the encryption value to a second record of the plurality of stored cypher records,
    associating the vendor server ID to the second record, and
    transmitting a message to the vendor server indicating the association of the vendor server ID to the second record.

6. The method according to claim 1 further comprising the step of executing, upon detecting the first match, and using a transaction subsystem of the vendor server, the trusted transaction associated with the identity claim.

7. A computer system comprising:
    a peripheral device;
    a vendor server; and
    a verification server comprising memory and a data store;
        wherein the peripheral device is operable to receive an identity claim comprising a biometric indicator;

wherein the vendor server is operable to receive, using a communication subsystem executed on the vendor server, the biometric indicator and a device identifier for the peripheral device;

wherein the vendor server is further operable to verify using the communication subsystem on the vendor server that the peripheral device is a trusted system by correlating the device identifier with a vendor server ID of the vendor server;

wherein the vendor server is operable to transmit, using an authorization subsystem executed on the vendor server, an identity claim comprising the biometric indicator and a vendor server ID to the verification server and then erase the biometric indicator and device identifier from the vendor server;

wherein the verification server is operable to receive the biometric indicator and the vendor server ID using an account management subsystem executed on the verification server, to verify the vendor server ID matches a stored vendor server ID for the vendor server, and to verify using an identity verification subsystem executed on the verification server the biometric indicator by
translating the biometric indicator into an encryption value, and
creating, upon detecting a first match of the encryption value and one of a plurality of stored cypher records, defined as a matched cypher record, an identity verification flag, defined as a pulse; and wherein the vendor server is operable to authorize the trusted transaction associated with the identity claim by:
receiving the pulse.

8. The computer system according to claim 7 wherein the device identifier comprises a universally unique identifier (UUID).

9. The computer system according to claim 7 wherein the vendor server ID is an IP address associated with the vendor server.

10. The computer system according to claim 7 wherein the verification server is further operable to associate the vendor server ID to the matched cypher record.

11. The computer system according to claim 7 wherein the verification server is further operable to store the encryption value to a second record of the plurality of stored cypher records, and to associate the vendor server ID to the second record.

12. The computer system according to claim 7 wherein the vendor server is further operable to execute, upon receiving the pulse, the trusted transaction.

13. A method of operating a biometric identity verification system comprising a peripheral device, a vendor server, and a verification server, characterized by a respective computer processor and by a respective non-transitory computer-readable storage medium, wherein the plurality of non-transitory computer-readable storage media comprise a plurality of instructions which, when executed by the plurality of computer processors, perform the method comprising:
receiving, using a biometric scanner application executed on the peripheral device, an identity claim comprising a biometric indicator;
receiving, using a communication subsystem executed on the vendor server, the biometric indicator and a device identifier for the peripheral device;
verifying using the communication subsystem on the vendor server that the peripheral device is a trusted system by correlating the device identifier with a vendor server ID of the vendor server;
transmitting, using an authorization subsystem executed on the vendor server, an identity claim comprising the biometric indicator and a vendor server ID to the verification server and then erasing the biometric indicator and device identifier from the vendor server;
receiving, using an account management subsystem executed on the verification server, the biometric indicator and a vendor server ID;
verifying, using an identity verification subsystem executed on the verification server, the biometric indicator by
translating the biometric indicator into an encryption value, and
creating, upon detecting no match of the encryption value to any of a plurality of stored cypher records, an identity verification flag to define an identity verification fail; and
disallowing, using an authorization subsystem executed on the vendor server, a trusted transaction associated with the identity claim by receiving the identity verification flag.

14. The method according to claim 13 further comprising the step of executing, using a transaction subsystem of the vendor server, a transaction access fail.

* * * * *